Nov. 26, 1940.                R. G. GUTHRIE                2,222,828
       MEANS FOR OPERATING UPON ONE OR MORE CONSTITUENTS OF
                A GASEOUS MEDIUM BY ADSORPTION
                    Filed March 31, 1937           4 Sheets-Sheet 1
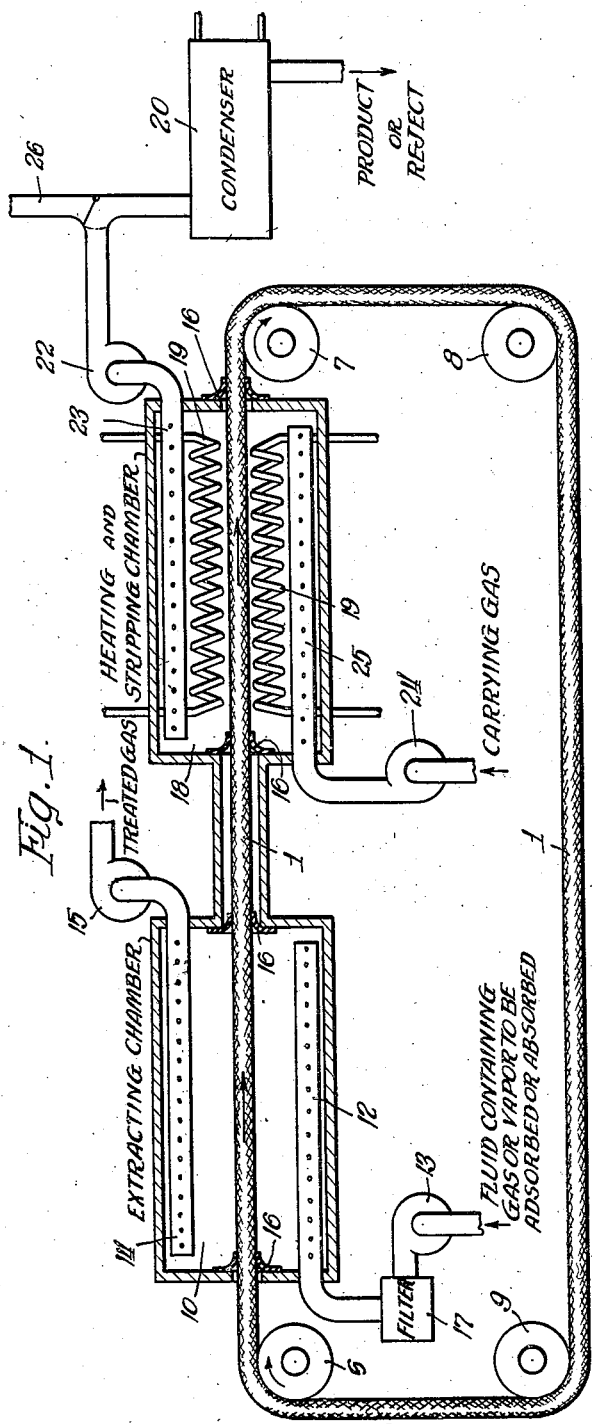
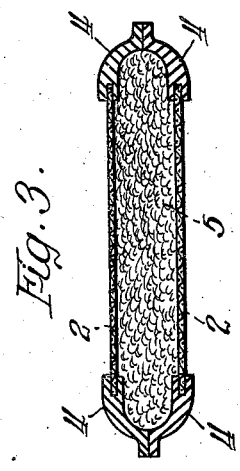
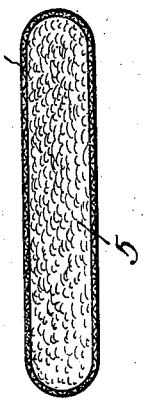
Inventor:
Robert G. Guthrie.

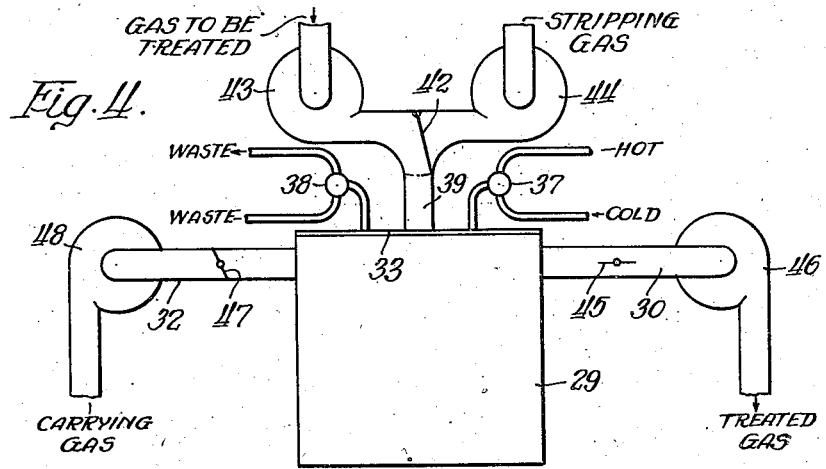
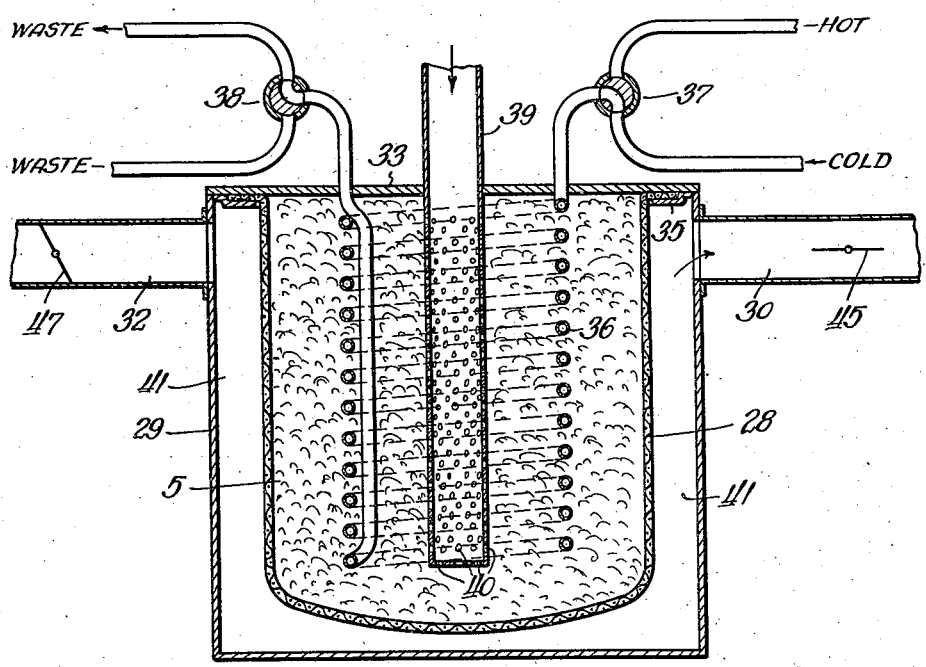

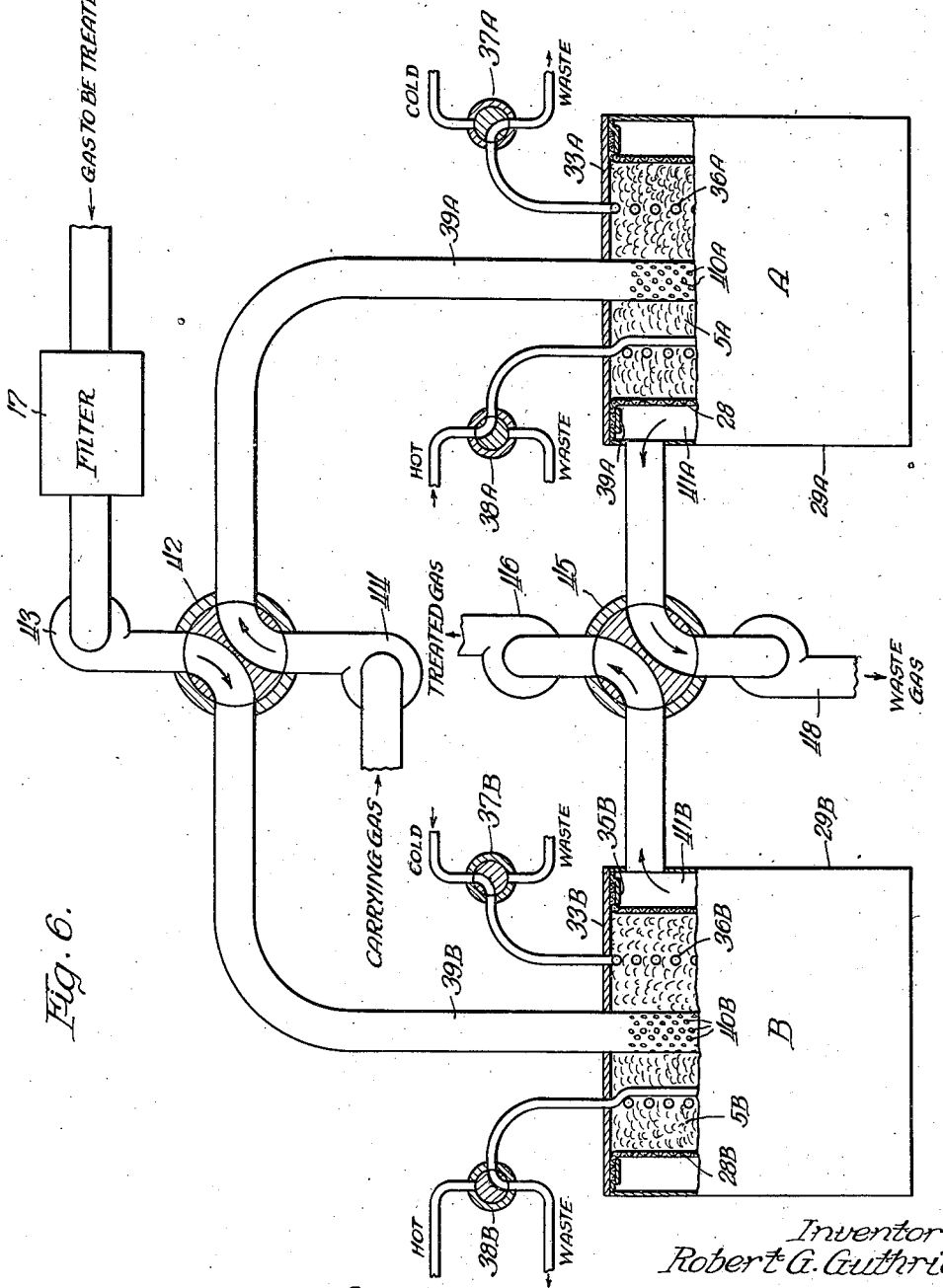

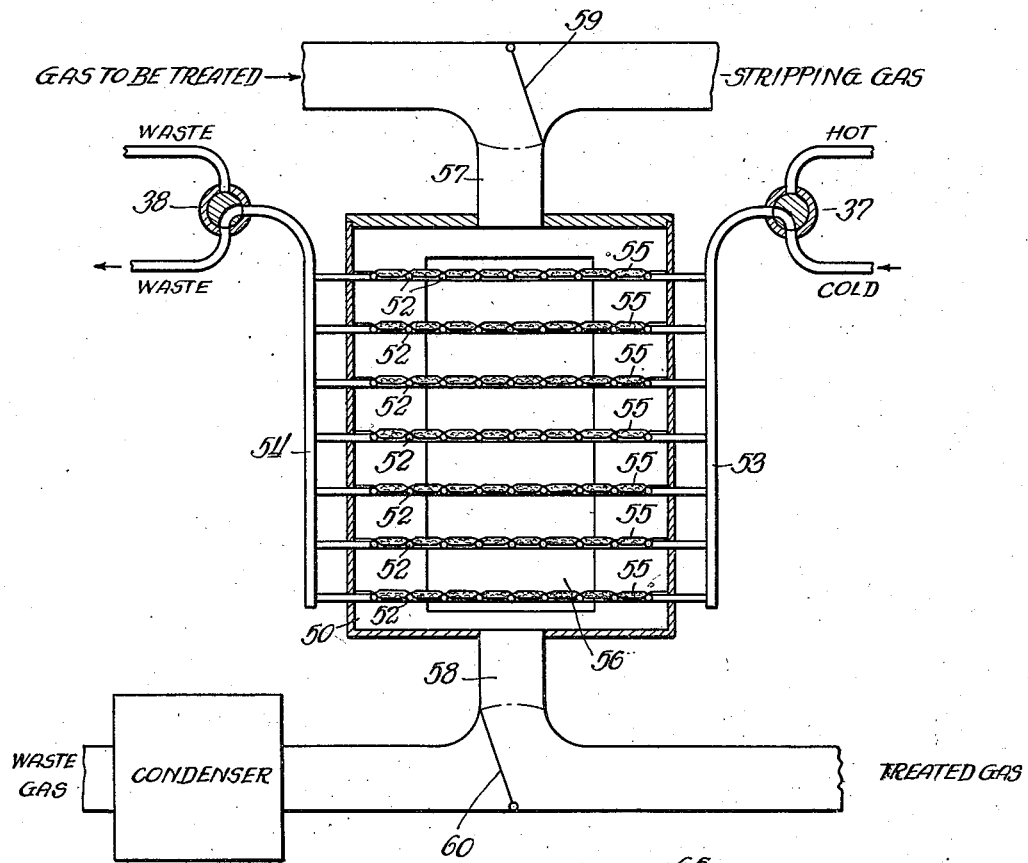
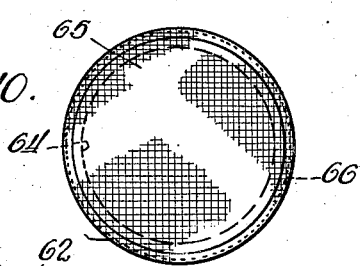
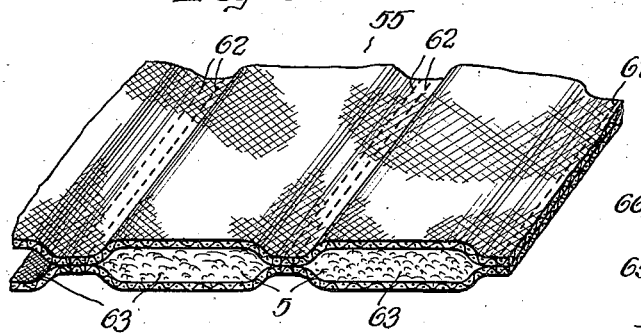
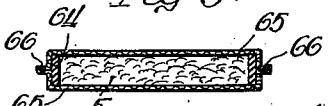

Patented Nov. 26, 1940

2,222,828

UNITED STATES PATENT OFFICE 2,222,828

MEANS FOR OPERATING UPON ONE OR MORE CONSTITUENTS OF A GASEOUS MEDIUM BY ADSORPTION

Robert G. Guthrie, Chicago, Ill., assignor to Peoples Gas By-Products Corporation, Chicago, Ill., a corporation of Illinois Application March 31, 1937, Serial No. 134,072

2 Claims. (Cl. 183—4)

My present invention relates to means for adsorbing or absorbing one or more constituents of a fluid medium and the treatment of the means by which such adsorption or absorption is accomplished.

In the preparation of silica dioxide absorbing media, such as "Lamisilite" or silica gel, the ore from which the material is prepared is subjected to a leaching action by sulfuric acid to prepare it for its use as an active adsorbing or absorbing material. As disclosed in my companion application, Serial No. 133,132 filed March 26, 1937, a container of fibers of silicious material, such as spun glass, asbestos and the like, resistant to chemical reagents, heat and other influences, may be utilized as a means for handling the material, both in the initial stages of preparation and in the use of the material for adsorbing or absorbing constituents of a gaseous medium. Such a container also serves to give form to the material, and to permit handling thereof in any cleaning and/or drying operations which may be necessitated by the continued use of the material. The spun glass to which I refer is very fine being of a cross sectional diameter under 0.001". Such a material is now spun in fibers of indefinite length. It is supplied to the market by Corning Glass Works.

For example, with a container made of silicious fiber, the ore may be leached in the acid to form the desired silicon dioxide product. The product in the container may then be employed for the operation of extracting constituents from a gaseous medium under conditions of use where the inert character of the container and its ability to withstand high temperatures is of very great value, and thereafter the container with the active material therein may be put through a cleaning process as by acid or alkaline reagents of a suitable degree of effectiveness, and then the container with the reconditioned material may again be employed in the extraction of constituents by adsorption or absorption.

In the practice of one embodiment of the present invention, I employ a continuous belt or traveling container of glass fiber, or other silicious fiber fabric, in which there is carried the active medium, and I move this container first into a region where its adsorbing or absorbing properties are utilized, and thereafter move the container and its charge of material into a region where the adsorbed or absorbed constituents are stripped from the material as by the use of heat, and, if desired, a carrying gas. The extracted constituent or constituents may be condensed or otherwise recovered or the extracted constituent may be rejected, depending upon the character of the industrial process involved and the constituent extracted.

According to another form of my invention, the container of silicious fiber with the enclosed active material may be maintained stationary and subjected alternately to contact with the medium containing the constituent to be extracted and thereafter subjected to heat and a carrying gas for stripping the active material of the extracted constituent.

For cleaning or reconditioning the active material, as by removing dirt, tarry or other foreign substances, this may be accomplished while the active material is in place, or the container with the active material may be removed from its normal position where extraction is carried on for a cleaning treatment.

Now in order to acquaint those skilled in the art with the manner of constructing and operating a device embodying my invention, I shall include in the accompanying drawings a specific embodiment and mode of use thereof.

In the drawings:

Figure 1 is a diagram of a system for extracting a constituent form of a gaseous medium and for the recovery of the same in liquid form;

Figure 2 is a cross sectional view of the continuous belt employed in the system of Figure 1;

Figure 3 is a cross sectional view of a modified form of belt for use in the system of Figure 1;

Figure 4 is a front elevation in diagrammatic form of an apparatus for treating gaseous medium to extract a constituent thereof;

Figure 5 is a vertical longitudinal cross section through the device of Figure 4;

Figure 6 is a diagram of the system for continuous operation employing the form of extractor shown in Figures 4 and 5;

Figure 7 is a vertical cross sectional view through a modified form of extractor;

Figure 8 is an isometric view of one of the pads or elements employed in Figure 7;

Figure 9 is a cross sectional view of a modified form of element; and

Figure 10 is a top plan view of the same.

Referring first to the system shown in Figure 1, a continuous belt I of tubular form as illustrated in cross section in Figure 2 is constructed of silicious fiber fabric, for example, a woven or knitted fabric of spun glass. Asbestos fiber may optionally be employed. Other silicious fibers inert to chemical reagents and capable of withstanding the temperatures of the order of 200° F.

to 300° F. in the same manner that glass fiber or asbestos fiber does, may be employed.

The continuous belt 1 may be made of a tubular knitted or woven fabric, or it may comprise strips of such silicious fiber fabric 2—2, as shown in Figure 3, having strips of rubber 4—4 vulcanized to the ends thereof, and corresponding strips 4—4 at each side thereof united either by vulcanizing or by mechanical means, if desired. Alternatively, the continuous tubular belt may be made up by sewing together the edges of a corresponding strip or strips. This tubular belt 1 is charged with a suitable active material 5, such as "Lamisilite," silica gel, or any other active medium which is capable of adsorbing or absorbing constituents of a gaseous medium for extraction purposes. The belt 1 may be made up as a continuous open structure, or it may be formed with pockets by transverse stitching of a suitable thread made of glass fiber or the like, somewhat in the same manner as the pad or element shown in Figure 8. This belt is trained over suitable guiding rollers or pulleys, such as are indicated at 6, 7, 8 and 9. The belt is first passed through an extracting chamber 10 into which chamber is discharged a fluid containing a gas, vapor, or other constituent to be adsorbed or absorbed. For this purpose a distributing tube 12, having suitable openings, is disposed at one side of the belt 1, and the gaseous medium to be treated is delivered into the chamber 10, as by means of the blower 13. Upon the opposite side of the belt 1 a similar distributing tube 14 leads to the intake of a blower or fan 15 for removing the treated gas. The walls of the chamber may be kept sealed to the belt 1, as by means of the flexible seals 16—16. Any suitable mode of keeping the chamber 10 substantially tight may be employed. The object to be accomplished in the chamber 10 is the contact of the medium to be treated and which contains the constituent to be extracted with the active material in the belt. The belt has a loose weave approximately that of a gunny sack, allowing free access of the gas to the active material 5. The belt seals itself along the sides of the chamber 10, so that substantially all of the medium is compelled to pass through the belt 1, except the constituents which are extracted.

The fans or blowers 13 and 15 may be driven in such ratio to each other that the space below the belt 1 in the chamber 10 may be slightly in excess of atmospheric pressure while the space above the belt 1 is slightly below atmospheric pressure. Thereby leakage is reduced and passage of the gas through the belt 1 is facilitated.

The gas to be treated may be first passed through a filter 17 to remove dust, tarry substance and the like.

Immediately after passing the extracting chamber 10 where adsorption or absorption has occurred, the belt is passed into the stripping chamber 18 similarly provided with suitable seals 16—16. Heating coils 19—19, which may be heated with steam, hot water or the like, raise the temperature of the active material in the chamber 18. This causes the adsorbed or absorbed constituent or constituents to be driven off. Any other suitable heating means may be employed. Such constituents may then be conveyed with or without a carrying gas to a condenser 20 where the constituent or constituents may be subjected to cooling and condensation, the condenser 20 being suitably water cooled or air cooled, as the case may be. If the stripped constituent is to be rejected, it may be extracted by a fan or blower 22 connected by a suitable distributing pipe 23 in chamber 18. More expeditious handling of the extracted constituent may be effected by blowing a carrying gas through the stripping chamber 18. For such purposes a blower 24 and distributing pipe 25 may drive gas through the belt 1 to the opposite side of the belt where the suction pipe 23 and blower 22 may carry the same to the condenser 10 or to a stack or waste pipe.

Such a system may be employed, for example, for recovering the volatile solvents used in various industrial processes, such solvents being condensed in the condenser 20 and recovered. The system may likewise be employed for extracting moisture from the atmosphere for air conditioning purposes. In the latter event, the water vapor present in the atmosphere is taken up by the active material in the chamber 10 and is stripped in the chamber 18 where it may be discharged to the stack at the connection 26. The speed with which the adsorbed or absorbed constituent is driven off depends upon the temperatures to which the active material is subjected. Desirably this is above 212° F. for water vapor. The heat to which the belt is subjected would tend to deteriorate organic fabrics but in the case of a silicious fiber fabric such temperatures are not objectionable, and have no deteriorating effect upon the container. The active material is subjected to a minimum of mechanical stress, and the breakage of the same thereby limited or prevented. Where the rubber margins are employed, as in Figure 3, the edges of the belt are not subjected to wearing because of the toughness of the rubber margins. To keep the material more nearly uniformly distributed in the belt 1, transverse stitching as indicated in the pad of Figure 8 may be employed. Other means for keeping the loose material from shifting in the container may be employed.

In Figures 4, 5 and 6, I have illustrated the use of a stationary extracting medium held in a silicious fiber container, such as the bag 28 shown in Figure 5. In this construction, an outer shell or chamber 29 is provided with gas connections 30 and 32 provided with suitable valves to allow the introduction of either the medium to be treated or of a stripping medium, as the case may be. The bag 28 is attached to the cover 33, as by a suitable clamping flange 35, and within the said bag there is disposed a heat transfer coil 36 which may be supplied with heating medium or cooling medium by suitable supply pipes and valves 37 and 38. A central distributing pipe 39 provided with a large number of slits or openings as indicated at 40, allows introduction of the medium to be treated into the bag 28. The space within the bag 28 and around the coil 36 and distributing pipe 39 is filled with the active material 5 which may be such a material as "Lamisilite," silica gel or the like, preferably a material having a high ratio of surface to volume, and having the desirable properties of being capable of adsorbing or absorbing the desired constituents. The heat transfer coil 36 maintains the material 5 at a suitable temperature during the extraction of the desired constituent. Thus, for example, in adsorbing or absorbing vapor constituents, the coil 36 is maintained at a relatively low temperature by the flow of cooling medium therethrough.

Upon the termination of the operation of absorbing or adsorbing, heating medium is passed through the coil 36, and a carrying gas may be passed through the space 41 between the bag 28 and the walls of the container 29. The connections shown in Figure 4 comprise a valve 42 to allow a gas to be treated to be introduced into the pipe 39 as by means of a blower 43 or the stripping gas may be introduced by the blower 44 when the valve 42 is shifted to corresponding position. When the gas to be treated is passed through the pipe 39, then the pipe 30 and valve 45 lead the treated gas to the blower 46 which discharges the treated gas. The valve 47 may connect the chamber 29 to the blower 48 which discharges the carrying gas bearing the constituent to be either condensed or rejected. Obviously, other arrangements of connections may be made for carrying out the alternate extraction and stripping operation.

In Figure 6 I have shown connections for utilizing two units A and B whereby when unit A is adsorbing or absorbing, unit B may be stripped of the absorbed or adsorbed constituent, and vice versa.

An alternate form of combined extracting and stripping chamber is shown in Figure 7. In this case, a drum or chamber 50 is provided with a series of gridlike coils 52—52 connected at opposite ends to the headers 53 and 54, which through the valves 37 and 38 may be supplied with heating and cooling medium selectively. Upon these grids 52—52 pads or active elements 55 are disposed these pads or elements substantially closing off the cross section of the drum or chamber 50. The drum or chamber 50 is provided with a removable side wall or plate, indicated at 56 through which the active elements or pads 55 may be inserted and removed, as desired. Connections 57 and 58 at top and bottom, respectively, provide means for passing through these pads the gas to be treated or a stripping gas, suitable valves 59 and 60 being provided to allow the switching of the medium passed through the active elements. Suitable blowers for causing movement of the gas in each case may be provided, as will be understood by those skilled in the art, and by reference to the diagrams of Figures 4 and 6. Valves 37 and 38 for admitting heating and cooling medium to the pipes 52 are also provided.

The pads or elements 55 are preferably constructed of a fabric skin or container sewed transversely as by the stitching 62 to provide pockets such as 63 for retaining the active material. These pads may be made of tubular fabric cross stitched, or they may be made up of a sheet or sheets suitably stitched together with glass fiber thread or the like, as shown in Figure 8.

In the operation of the unit shown in Figure 7, the coils 52 are connected to a cooling medium and the gaseous medium to be treated is passed through the chamber 50. The adsorption of the constituent in vapor phase results in the evolution of heat, and this is carried away by the current of cooling medium through coils 52.

Thereafter the valves 37—38 and 59—60 are shifted to heat the coils 52 while a stripping gas is passed through the chamber 50. Obviously, a condenser is employed when the stripped constituent is to be recovered. If desired, the use of stripping gas may be greatly reduced or omitted where the condenser is maintained at a reduced pressure.

Obviously, instead of a rectangular pad or element a circular element may be made up. A modified form of element is shown in Figure 9. In this case the element is circular. A ring or hollow cylinder 64 of rubber, glass or other inert material is covered with glass thread fabric 65—65 or equivalent material, the margins being fastened together as by sewing, as indicated at 66, or fastened in any other preferred manner to form a hollow drum, which is filled with active material 5. The frame or ring may be provided with an external sealing or mounting flange if desired. Such elements may be disposed transversely in a chamber as illustrated in Figure 7, and they may be inserted or removed as desired. After a period of use in the extraction of constituents from the gaseous medium, the active material and the surface of the glass fabric or asbestos fabric or the like requires cleaning, and to this end, depending upon the character of the impurities, a suitable cleaning fluid may be employed for removing the same. The elements may be taken from the treating chamber and subjected to the desired reagent or cleaning fluid, and dried either in a centrifuge or by hot air or the like, or by swinging mechanically, as one would swing a wet sponge to throw off the excess of moisture without injury to the fabric or the active material.

Instead of disposing a plurality of pads in series, these pads may be arranged in parallel so that maximum surface is simultaneously exposed in a single pass.

As above explained, the active material may be formed from the ore within such a container as is illustrated in Figures 8 and 9. The leaching operation and the cleaning operation are similar.

The utility of a unitary mat or element is apparent to those skilled in the art.

I do not intend to be limited to the specific structures, or specific mode of use described, as the same is intended to be illustrative rather than limiting.

I claim:

1. In a gaseous fluid contact apparatus, a flexible fabric container pervious to gaseous fluids, and a mass of adsorbent material therein, said flexible fabric container being substantially unaffected by temperatures in excess of boiling water and substantially inert to ordinary chemical reagents, means for passing gaseous fluid into contact with the adsorbent material to produce adsorption, and means for heating the adsorbent material to drive off the adsorbed constituent, said container being removable as a non-rigid self contained independent unit for treatment of the adsorbent material by a strong oxidizing reagent while the latter is retained in the container.

2. Means for extracting a constituent of a gaseous medium comprising a flexible, pliant, hollow belt-like container carrying an active material capable of adsorbing a constituent of said gaseous medium, said container comprising sidewalls of open mesh fabric of spun glass fibers, an adsorption chamber in which the gaseous medium contacts with the active material for the adsorption of said constituent and a stripping chamber wherein said adsorbed constituent is stripped from the active material, said latter chamber having means for subjecting the active material to stripping temperature, said container being passed endwise successively through said chambers, the container and the active material being capable of withstanding the action of a strong cleaning acid.

ROBERT G. GUTHRIE.